United States Patent [19]

Longenecker

[11] 3,993,788
[45] Nov. 23, 1976

[54] CONTINUOUS HIGH-SPEED COOKING AND COOLING METHOD USING PRE-HEATED INGREDIENTS AND PREDETERMINED RADIANT HEATING PATTERNS FOR THE PRODUCTION OF TORTILLAS AND SIMILAR PRODUCTS

[75] Inventor: John G. Longenecker, Ozone Park, N.Y.

[73] Assignee: Automation International Corporation, Norwalk, Conn.

[22] Filed: Apr. 11, 1975

[21] Appl. No.: 567,425

[52] U.S. Cl. .............................. 426/243; 426/496; 426/502; 426/523
[51] Int. Cl.² .......................................... A21B 1/42
[58] Field of Search ................. 99/443 C, 423, 427; 219/388; 432/146; 426/523, 549, 496, 556, 497, 557, 502, 241, 498, 243

[56] References Cited
UNITED STATES PATENTS

| 838,270 | 12/1906 | Peters | 432/146 |
| 2,146,427 | 2/1939 | Hawkins | 99/443 C |
| 3,310,007 | 3/1967 | Ford | 219/388 X |
| 3,478,704 | 11/1969 | Ford | 426/502 |
| 3,843,315 | 10/1974 | Sorensen | 432/146 |

FOREIGN PATENTS OR APPLICATIONS 247,298   2/1926   United Kingdom ............... 99/443 C

OTHER PUBLICATIONS

AMF Thermo–Radiant Single–Lap Tray Ovens; 1949; American Machine & Foundry Co., 200 Shelton Ave., New Haven, Conn.

Primary Examiner—S. Leon Bashore
Assistant Examiner—Kenneth M. Schor
Attorney, Agent, or Firm—Parmelee, Johnson & Bollinger

[57] ABSTRACT

A method and system for continuous high-speed commercial cooking and cooling using pre-heated dough ingredients for making products such as tortillas, provides predetermined specific heating patterns in an infrared cooking sequence which assures consistent product characteristics. Dough blanks formed of pre-heated ingredients are conveyed past predetermined sequences of infrared burners within an oven along a series of paths to sequentially expose alternate sides of the pre-heated ingredients to intensive radiant heating patterns each of decreasing heat intensity and of predetermined short time duration. Conveyors within the oven are synchronized to maintain blank spacing similar throughout the cooking process and turnaround chute means reverse and transfer blanks from one conveyor to another for alternatively exposing opposite sides of the articles to the radiant heaters. Burner cooling and fume exhaust is obtained by introducing air near the center of the oven and discharging it at the oven ends. Ignition of gas burners and flame sensing is accomplished through full burning pilot tube means extending the length of each bank of radiant heating burners. A subsequent high velocity and lengthy travel of the cooked tortillas while they are being individually exposed to ambient air serves to cool the tortillas and to permit escape of any residual internal free moisture, thereby avoiding the subsequent release of moisture or softening of the cooked and attractively browned surface skin layers for enabling stacking without sticking together.

17 Claims, 10 Drawing Figures

CONTINUOUS HIGH-SPEED COOKING AND COOLING METHOD USING PRE-HEATED INGREDIENTS AND PREDETERMINED RADIANT HEATING PATTERNS FOR THE PRODUCTION OF TORTILLAS AND SIMILAR PRODUCTS

BACKGROUND OF THE INVENTION

This invention relates to a continuous, high-speed cooking and cooling method and system for the production of cooked foodstuffs made from dough. In particular, this invention pertains to the continuous high speed cooking and cooling method and system utilizing a predetermined specific infrared heating pattern to produce cooked corn flour cakes, commonly known as tortillas, consistently possessing commercially attractive appearance, flavor, texture and an upper browned toasted skin surface having integrity, flexibility and enough self-supporting strength that it can be lifted away from the body of the tortilla by the consumer for inserting edible fillings.

Commercially produced cooked dough foodstuffs, such as pizzas, pancakes, and tortillas, are food items having popular appeal to a wide variety of consumers. However, the success of commercial production of such food items depends on many factors including efficient and economical processes and machines that not only enable high-speed production but also consistently reproduce the flavor, texture and appearance of the cooked food item which consumers have come to associate with a desirable good quality product.

While the desired characteristics of a cooked food item may be reproduceable at an acceptable level when home cooked on a small scale repeatedly by the same individual, the same does not hold true in all commercial productions. Thus, in commercial production of cooked food items many variables affect the characteristics and quality of the product. For example, if production control is too dependent upon the discretion of the process or machine operator a variation in end product characteristics is likely to occur from plant shift to shift, from plant to plant or from one time to another depending on changes in personnel. Although consistency and reproduceability in product characteristics and quality is desirable, sufficient flexibility in control of these characteristics is also desirable where consumer preferences may vary, as from locality to locality.

A tortilla is a cooked, round, thin cake of unleavened corn flour usually eaten hot with or without a topping, or rolled with seasoned meat to form an enchilada. Consumers have come to expect that a tortilla consist of three layers, namely, a moist cooked center layer surrounded by a skin on either surface. One skin is attached to the moist cooked central layer; this may be considered the bottom side. The other skin is normally not attached to the central layer, having been blown free by internal steam generation. These top and bottom skins are light colored and have a skin flexibility sufficient to enable the tortilla to be rolled around other foodstuffs to make enchiladas, or the like. The top skin desirably constitutes a large blister, that is, it is normally free of the central layer and has integrity, flexibility and sufficient strength to be self-supporting. In a tortilla which possesses characteristics meeting the approval of a knowledgeable consumer, the upper skin is usually of such completely cooked and brown character that it can be pulled away from the moist center layer by a person's fingers. Consequently, a commercially acceptable tortilla must possess not only the requisite taste and flavor and inner cooked texture and consistency but it must also possess an appearance appealing to the eye and preferably have an upper flexible skin which constitutes an integral large blister.

Many prior art processes and apparatus attempting to produce tortillas possessing the requisite characteristics of flavor, texture and appearance have done so only in a laborious and time consuming manner so as to be commercially unsatisfactory from the standpoint of efficiency and economy. Generally, in the prior art cooked dough foodstuffs, such as tortillas, have been produced by first employing a mixer, usually located remotely from the tortilla forming equipment. This remote mixer is used for mixing the ingredients, such as flour in a liquid to form a dough. Then the dough is moved to the tortilla forming equipment for shaping it into the desired form and finally cooking it on calcium salt coated hot metal slats in the nature of a griddle to yield the end product. Attempts to speed up the cooking by raising the temperature or heating action applied to tortillas causes a burning or blackening of the exterior while leaving the interior in an unsuitable semiraw or uncooked condition.

Thus, there exists a need for a process and apparatus which will enable the production of consumer acceptable tortillas while at the same time providing the economy and efficiency of commercial production.

SUMMARY OF THE INVENTION

The present invention overcomes the disadvantages of the inefficient prior art processes and apparatus and provides a method and system for the continuous high-speed commercial cooking and cooling of dough products such as tortillas, which results in a product possessing consistent characteristics of flavor, texture and appearance desired by consumers. The foregoing is accomplished according to this invention through a method and system of infrared cooking of pre-heated dough foodstuff according to a predetermined specific heating pattern in a cooking sequence which assures that the foodstuff, such as a tortilla, is cooked to a moist central layer surrounded on top and bottom by a light colored skin, and with the top skin normally free of the center layer and being an integral, flexible brown toasted skin.

In a specific embodiment of this invention infrared burners are placed within an oven in an intermittent arrangement past which the raw dough foodstuff, such as a tortilla, is conveyed. The tortilla proceeds through the oven and past the burners in three successive passes which result in a cooking sequence as follows: The first side of the raw formed pre-heated tortilla is exposed to the infrared burners in a heating pattern which results in initially applying highly intensive radiant heating effect to said first side and thereafter applying a progressively decreasing intensity of infrared heat as the tortilla is conveyed along a first path past the burners. The tortilla is turned over; and as the tortilla is conveyed along a second path, the second side is exposed in similar manner, i.e. with initial highly intensive radiant heating effect followed by progressively decreasing heat intensity. Finally, the tortilla is turned once again to expose the first side again and is conveyed along a third path past a sequence of infrared heaters arranged in a similar manner lightly browning the upper surface into a flexible, integral skin and causing this upper skin to be lifted free of the moist center layer like a single large blister caused by the generation of internal steam pressure within the tortilla beneath the upper skin.

The foregoing cooking method results in a tortilla absorbing sufficient heat to gelatinize the corn flour at a rate so that the tortilla may be cooked through without burning or drying out of the surface to the extent that brittleness will occur. Each side is so cooked and the surfaces of both sides are sealed in the first two passes such that on the third pass the moisture within the tortilla generates a steam pressure which expands and forms the desired blister under and thereby lifting the upper skin. In this manner, a commercially attractive tortilla is obtained with an oven dwell time for a tortilla as low as 36 to 48 seconds while at the same time the heat energy consumed in the furnace for each tortilla is significantly reduced in comparison to that required for other oven cooking processes.

The method and system of this invention enables the production of commercially attractive and appropriately flavorable tortillas at a production rate of 500 tortillas per minute without a sacrifice in the desirable criteria of flavor, texture and appearance discussed heretofore. The method and system thus provides a quality product in an efficient and economical method and system by utilizing efficient synchronization of the various method steps and machine components. Not only is the possibility of inadvertent variation eliminated by providing a predetermined cooking sequence but also the cooking sequence and heating pattern may be controlled so as to meet the criteria for each particular raw dough foodstuff to be cooked or to produce a product meeting the consumer preferences of a particular area.

It is a feature of this invention to provide a continuous high-speed process for the production of cooked dough foodstuffs, such as tortillas, pizzas, pancakes, and the like, utilizing a specific infrared heating pattern. It is a further feature of this invention to provide a high-speed synchronized machine system for the continuous high-speed production of cooked dough foodstuffs.

The oven system of this invention incorporates synchronized conveyors to provide three passes through the oven past infrared burners placed in intermittent arrangement in three rows corresponding to each pass and utilizes a unique cooling system for the burners so as to obtain maximum operational efficiency with low capital cost. Thus, it is a further feature of this invention to provide a synchronized multi-pass oven for the continuous high-speed production of cooked dough foodstuffs, particularly tortillas for producing the desired flexible skin layers with the top skin layer free from the central layer.

In conveyance past the burners in the oven, the tortillas are cooked on each of the two sides so that in proceeding from one pass to the other the tortillas are efficiently and accurately turned over according to an apparatus of this invention. Thus, it is yet another feature of this invention to provide a tortilla transferring and turning means to enable transfer from one conveyor system to another to turn the tortilla on its other side.

Advantageously, the cooked tortillas are conveyed along a number of paths by cooling conveyors which individually expose each tortilla to ambient air for cooling them and to permit the escape of any residual internal free moisture. Thus, the subsequent release of moisture from the interior into the attractively browned surface skin layers which would cause undesired softening thereof is avoided for providing a commercial tortilla product which can be stored and stacked without sticking together.

BRIEF DESCRIPTION OF THE DRAWINGS

The aforementioned and other various advantages and features of the production method and system of the present invention for making cooked dough foodstuff products such as tortillas will become more fully apparent from a consideration of the following description taken in conjunction with the accompanying drawings in which:

FIGS. 2A and 2B together show a side elevational view, partly in section, of the continuous high-speed cooking system using a predetermined heating pattern for the production of cooked tortillas according to the embodiment of the present invention, and more particularly FIG. 2A shows the pre-heated dough blank forming apparatus and oven input side of the system while

DESCRIPTION OF THE PREFERRED EMBODIMENTS

Figure 1A:
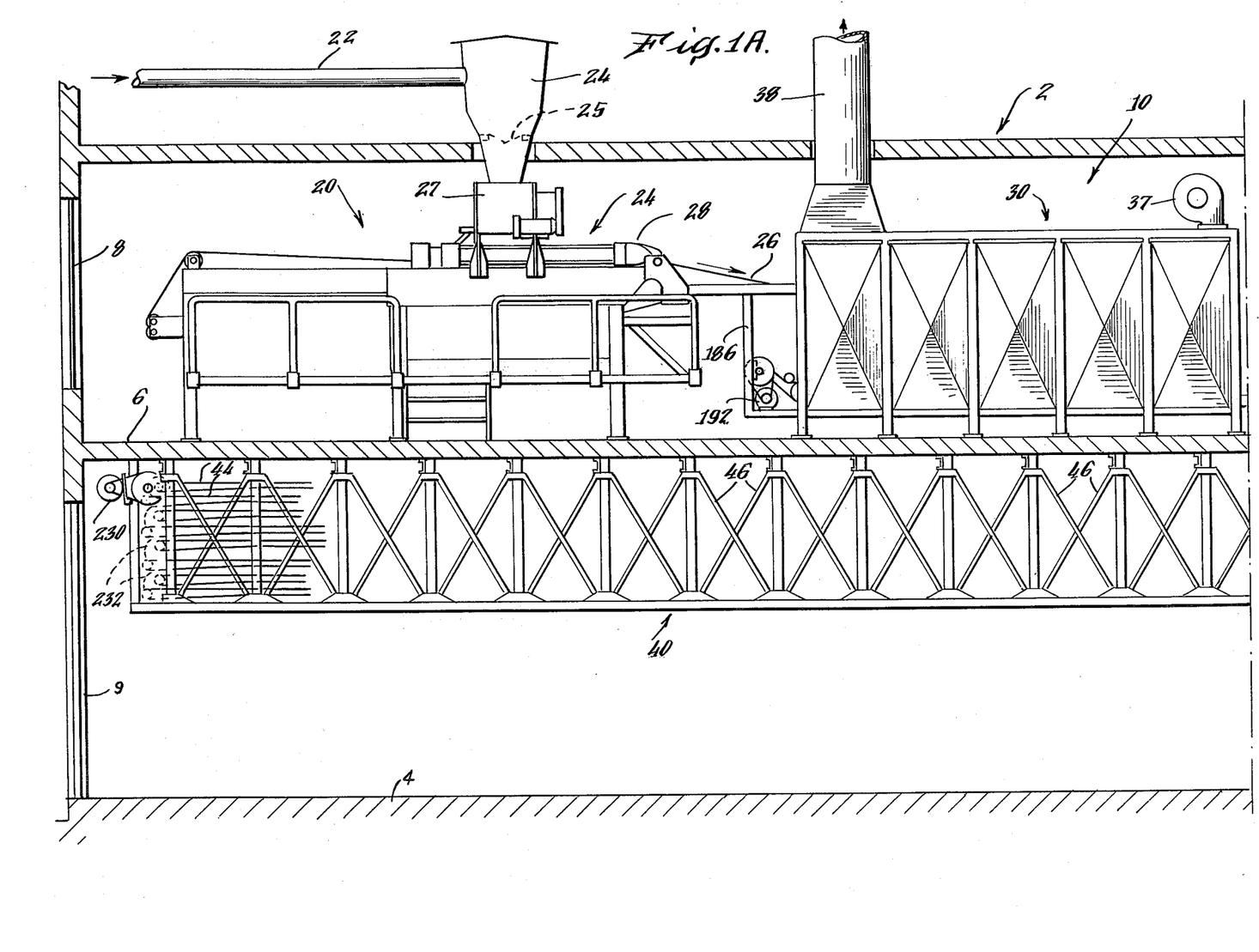
FIGS. 1A and 1B together show a side elevational view of a complete continuous high-speed tortilla producing machine system and production line embodying the present invention and employing the method thereof.
Figure 1B:
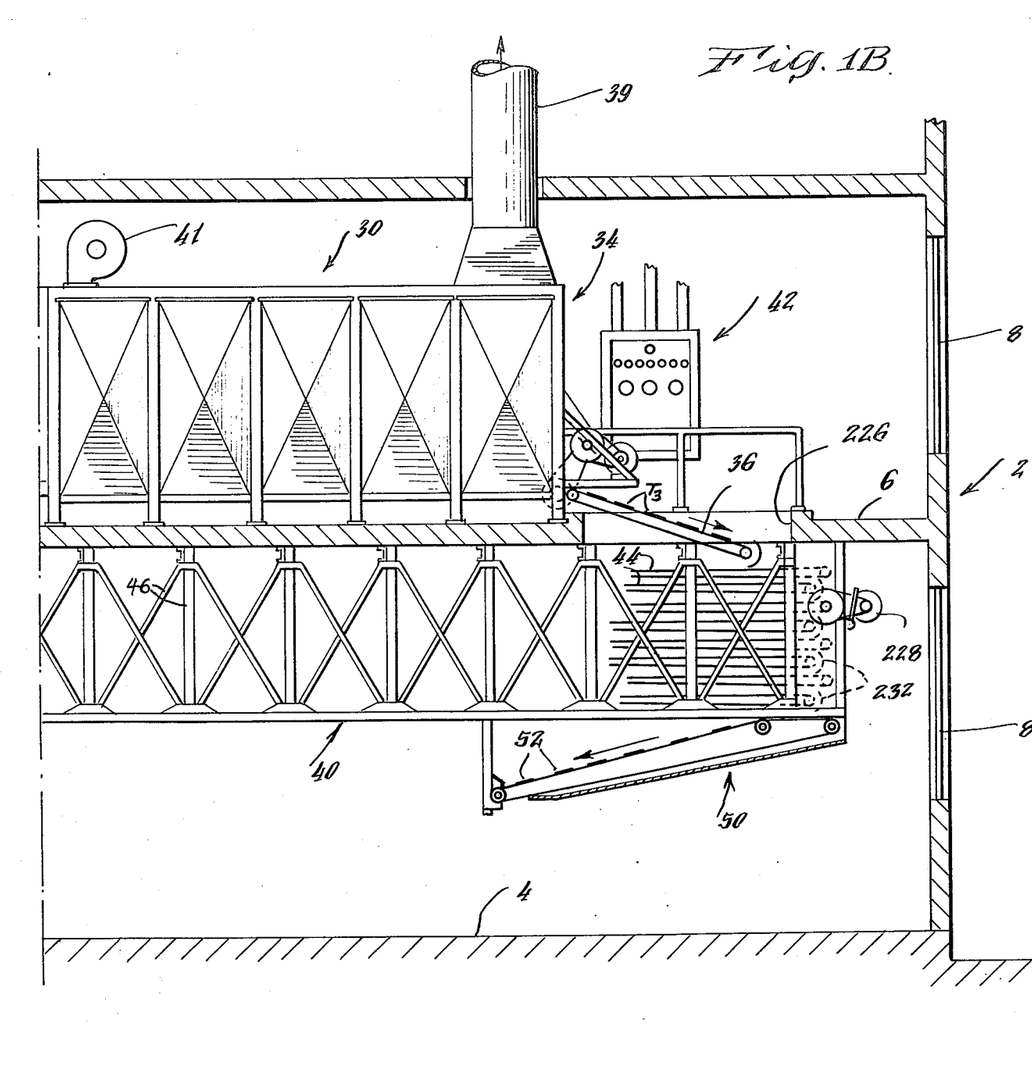

Referring to FIGS. 1A and 1B there is illustrated a complete production line for the production of cooked and cooled tortillas starting with the proportioning and mixing of corn flour and water to form a dough and ending with the cooked and cooled tortillas ready for further handling. The production line illustrated in FIGS. 1A and 1B utilizes the continuous high-speed cooking and cooling method and system of this invention.

In order to provide a fuller appreciation of this tortilla production line process and machine system, the production line of FIGS. 1A and 1B is shown with its various components of equipment positioned in production sequence within a two-story building as may be advantageously done. FIG. 1B illustrates the output side of the production line and when laid end to end at the right of the illustration in FIG. 1A, the complete production line is shown.

Thus, referring to FIGS. 1A and 1B there is shown a complete production line, referred to generally at 10, housed within a two-story building 2 having a first floor 4 and a second floor 6, on which are supported equipment, and provided with windows 8 for ventilation and a door 9. The production line 10 includes an ingredient proportioning, mixing and dough forming station 20, an oven cooking station 30, a cooked product cooling station 40, and an output conveyor station 50 for the cooked and cooled tortillas. At the ingredient proportioning, mixing and dough forming station 20, corn flour and water are weighed and measured and charged to a mixer-extruder 24. The mixer-extruder 24 mixes the corn flour and water and expresses round shaped dough blanks for forming tortillas which are conveyed on a conveyor 26 to the oven cooking station 30.

The flour may be supplied by air conveyance through a supply duct 22 into a hopper 23. A batch weigher 25 discharges the flour down into a bin 27 which in turn feeds down into the mixer extruder 24. In order to pre-heat the dough in the mixer extruder 24, hot water is mixed with the flour therein. An extruder die and blank former mechanism 28 forms the round shape tortilla blanks of pre-heated dough and delivers them to the conveyor 26. In this system 500 tortilla blanks per minute in four rows are delivered into the oven station 30.

Figure 2A:
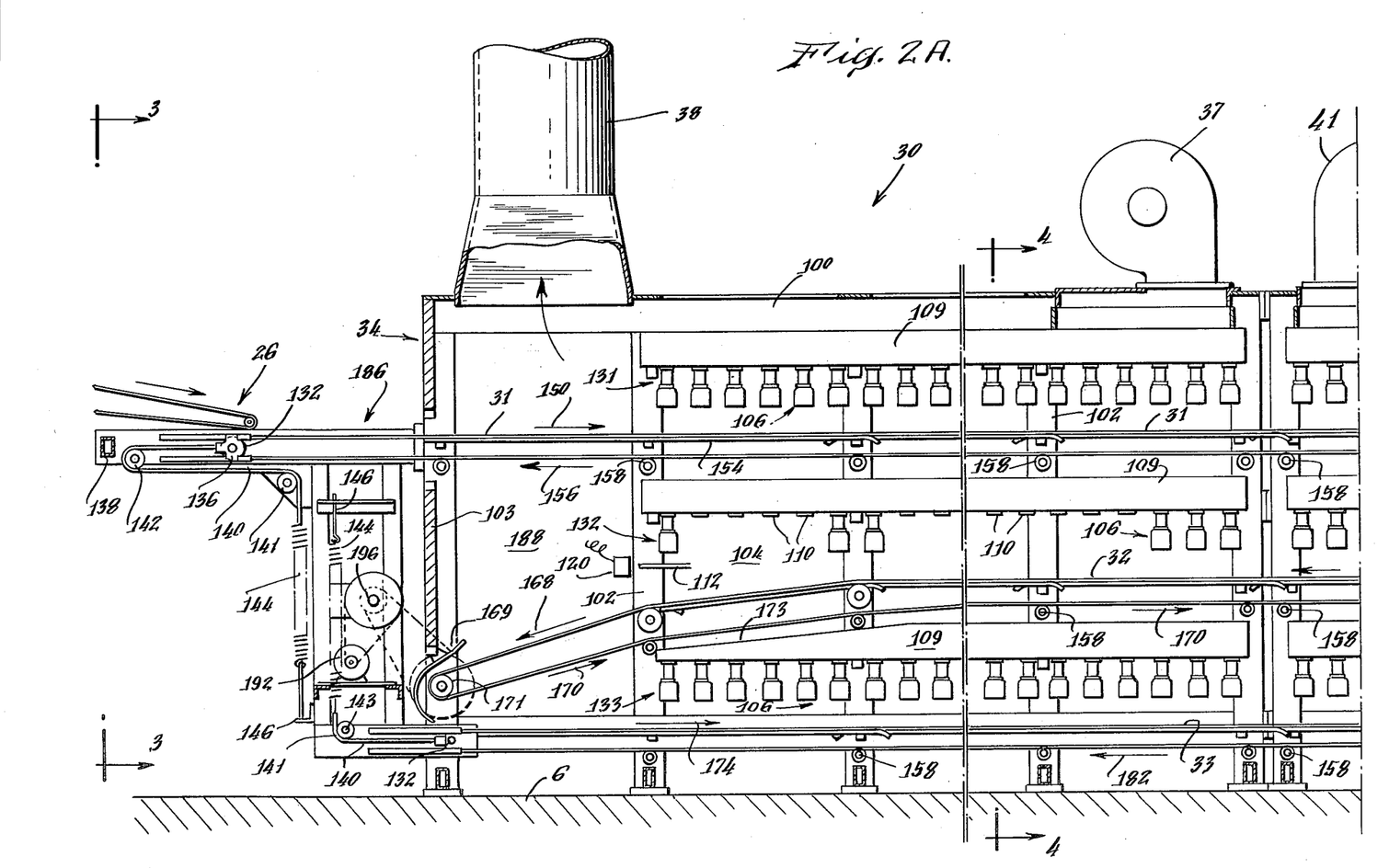
Figure 2B:
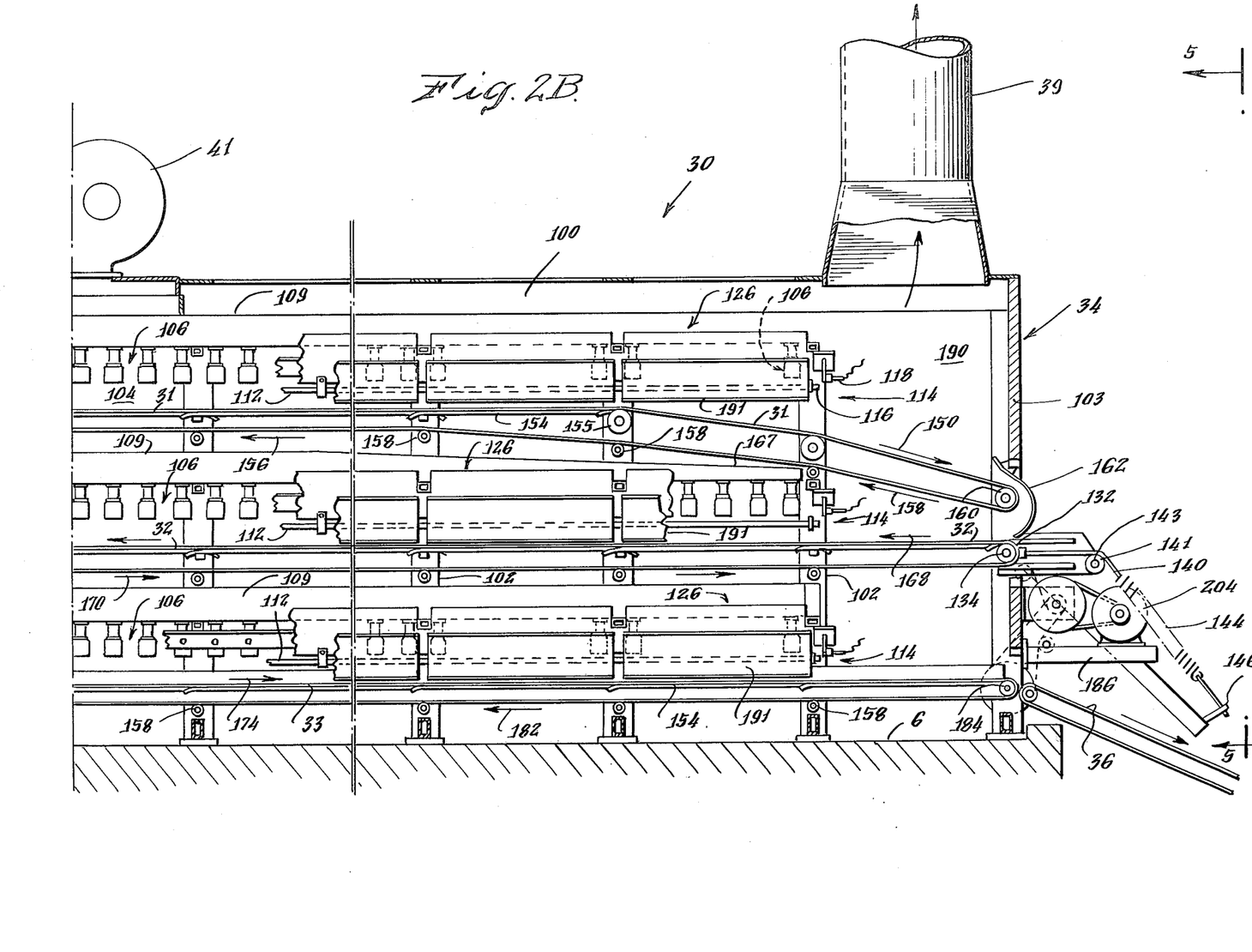
FIG. 2B shows the cooked tortilla oven discharge side of the system.

In the oven cooking station 30, which wll be explained in detail hereinafter, the tortilla blanks are conveyed into the oven 34 (FIG. 2A) on a first conveyor 31, proceed through the oven in several cooking passes on a sequence of conveyors 32 and 33, and are discharged from the oven as a cooked product onto a transfer conveyor 36 (FIG. 2B). The oven is cooled by means of forced air circulation entering the air intake blowers 37 and 41 and is discharged through the exhaust stacks 38 and 39. A control panel, illustrated generally in FIG. 1B at 42, is utilized to maintain observation and control of the oven cooking process in coordination with the other production line operations.

The ingredient proportioning, mixing and dough forming station 20 and oven cooking station 30 are, as seen in FIGS. 1A and 1B, located on the second floor 6 of the building 2. From the oven cooking station 30 the cooked tortilla is transferred, by the transfer conveyor 36, to the cooling station 40 which constitutes a plurality of conveyors 44 (FIGS. 1A and 1B) suspended below the second floor 6 by means of the structural framework 46. In the cooling station 40 the tortillas are transported back and forth within the confines of the building to gain the time desired to cool the product and to allow the free moisture within each tortilla to migrate through the skin to the surface and to evaporate so that the product is ready for further processing. Because the tortillas are being transferred out of the oven station 30 at a rate of about 500 per minute, the total length of travel provided by the back-and-forth conveyors 44 is the equivalent of a great distance to provide the desired time of at least three and one-half minutes for cooling of the cooked product from the oven cooking temperatures and for migration and evaporation of moisture so that they may be suitable for further handling. After the tortillas 52 (FIG. 1B) have been cooled and de-moisturized, they are transferred to the output conveyor station 50.

FIGS. 2A and 2B, taken together, show the oven 34 of the oven cooking station 30 of the production line illustrated in FIGS. 1A and 1B in an enlarged sectional elevational view with portions omitted, as shown by the broken lines, for clarity of view. Referring to FIGS. 2A and 2B, there is seen the oven 34 formed by a housing 100 mounted on the floor 6 by means of suitable framework supports 102 and defining an internal oven chamber 104. Within the oven chamber 104 are mounted, in a specific arrangement to be described hereinafter, a plurality of infrared ceramic tile gas burner assemblies 106.

Figure 3:
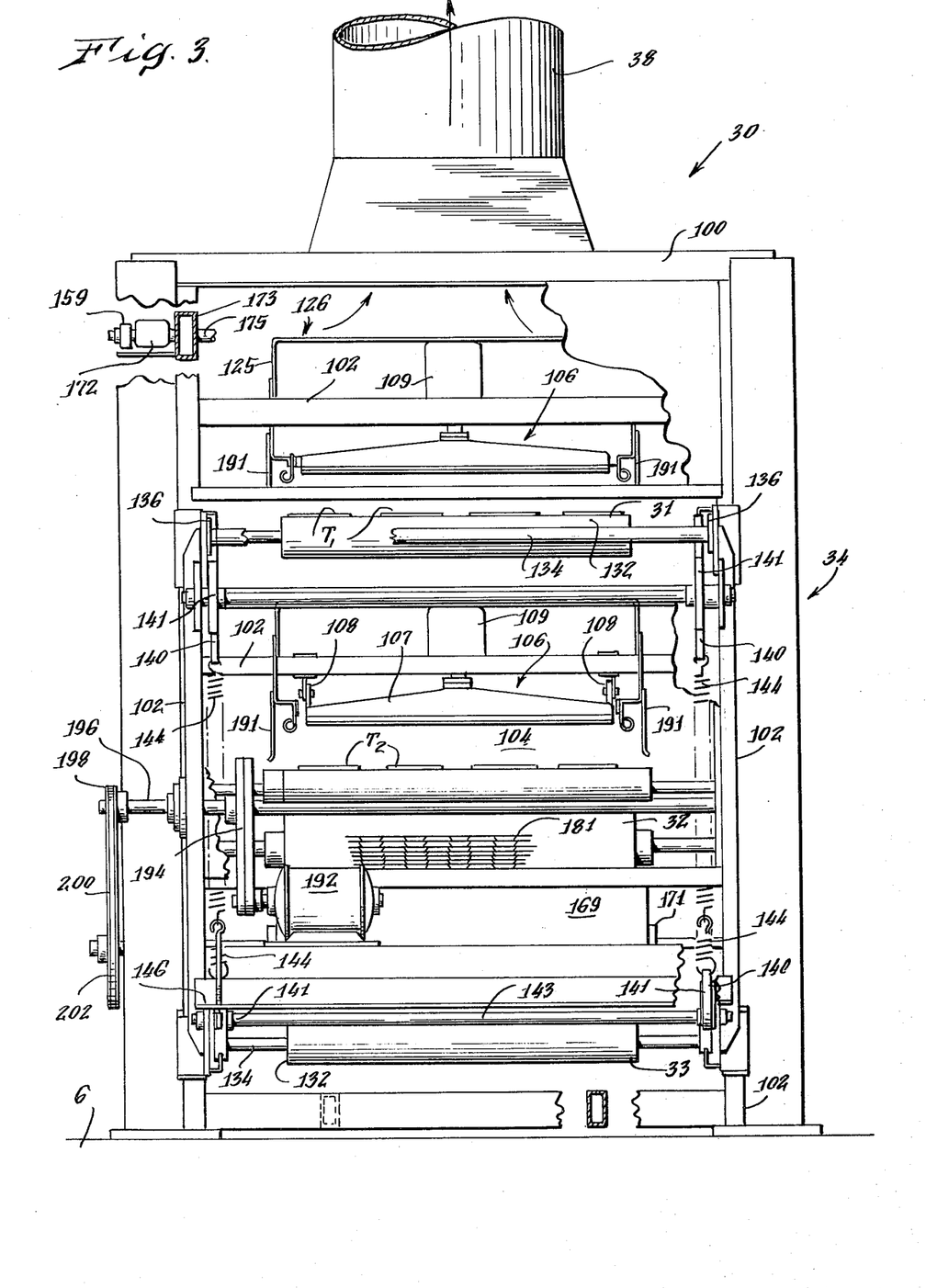
FIG. 3 is an infeed end elevational view of the high-speed predetermined heating pattern infrared oven taken along the line 3—3 of FIG. 2A.
Figure 4:
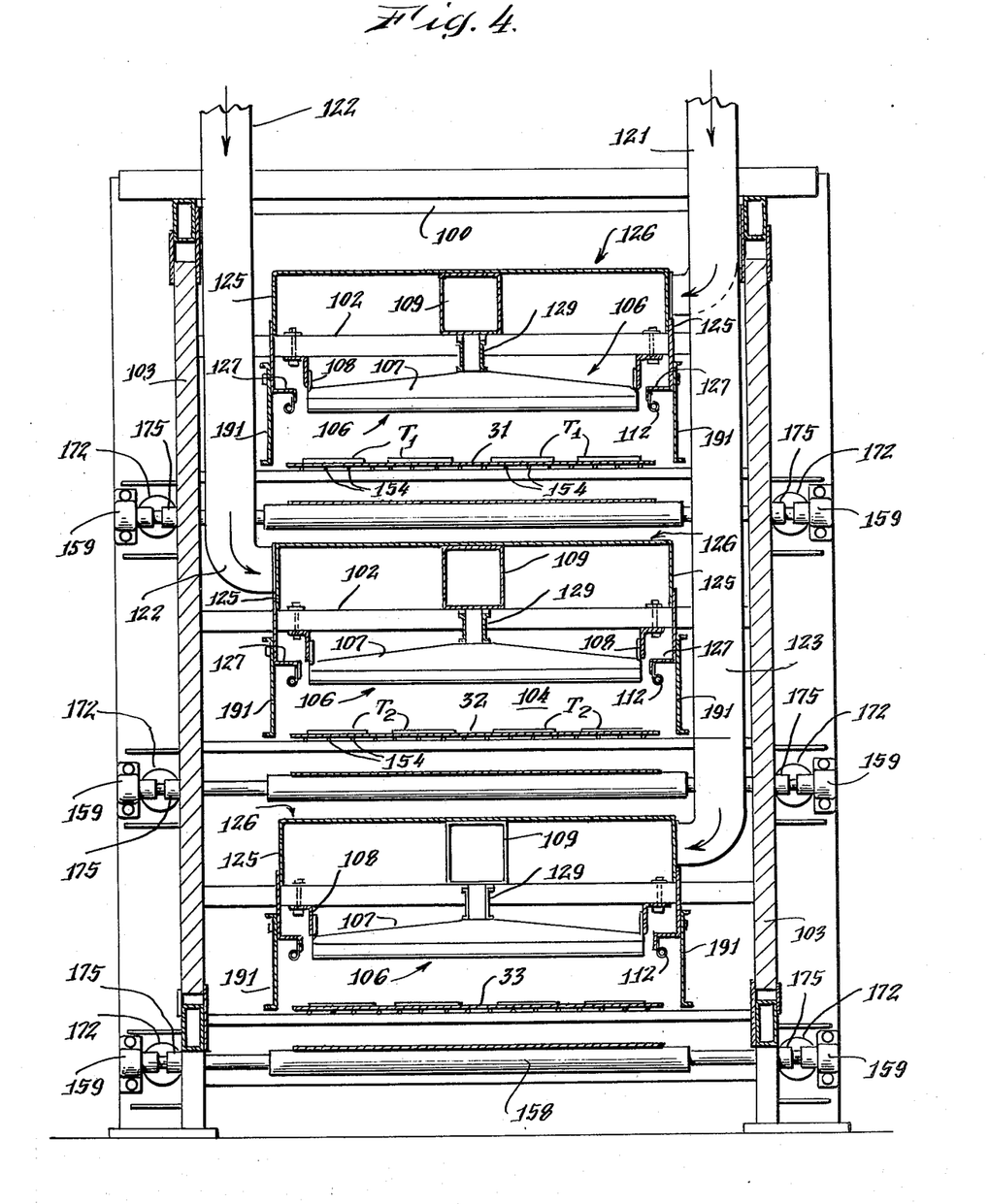
FIG. 4 is a sectional view through the oven interior, taken along the line 4—4 of FIG. 2A, and showing the oven cooling and intake duct system.

The gas burner means 106 may be of the ceramic tile surface "Schwank" type burner arranged in a burner support 107 with brackets 108 and fueled from a common manifold 109, all best seen in FIGS. 3 and 4, contained within burner cooling ducts 126 suspended from the oven framework 102. These cooling ducts 126 as seen in cross section in FIG. 4 extend above the top of the fuel feed manifold 109 with side walls 125 extending down and inturned flanges 127 near the respective ends of each of the burner assemblies 106. Portions of these cooling ducts 126 are shown in FIG. 2B, but they have been omitted from FIG. 2A for illustrating other portions of the oven more clearly.

As can be seen from FIGS. 2A and 2B, the arrangement of gas burner assemblies 106 along each conveyor path 31, 32 and 33 forms an intermittant series so that in place of the gas burner assemblies in some locations there appear the manifold plug caps 110. Ignition of the burner flame is achieved for all of the burners along each respective conveyor path 31, 32 and 33 by means of a fuel burning pilot tube 112, seen best in FIGS. 2B and 4, running the entire length of the oven section containing the burners. One end of each pilot tube 112 (FIG. 2B) terminates at an ignitor assembly 114 comprising a pilot head 116 with an electric spark plug 118. At the other end of each of the three pilot tubes 112, seen in FIG. 2A, there is located a flame sensor assembly, referred to generally at 120 (only one is shown) for assuring the ignition of all burners in the series along the path of each pilot tube and accurately sensing an on-off condition.

The portions of the oven chamber 104 containing the gas burner assemblies 106 constitute the heating sections of the oven through which the dough blanks, such as for tortillas, travel for cooking. The dimensions of the heating section and, thus the oven, are determined by the product velocity through the oven and the cooking time desired. Powerful cooling air flow is provided to maintain the gas burners 106, burner supports 107 and the manifold 109 cool during operation as well as to remove fumes from the oven before, during and after operation.

For an oven of considerable length, such as the embodiment shown at 34, the series of burners 106 along each of the conveyor paths 31, 32 and 33 are advantageously cooled in two sections by introducing cool air near the center of the oven through six respective air intake ducts, three of which are shown at 121, 122 and 123 (FIG. 4) located near the center of the oven, and exhausting the heated air and fumes at the input end of the oven through the exhaust stack 38. Thus, the three intake ducts 121, 122 and 123 feed cool air into the respective cooling ducts 126 located over and around the burner assemblies 106 associated with the left halves of the conveyors 31, 32, and 33 as seen in FIG. 2A, and the exhaust passes up the stack 38 at the input end of the oven. There may be provided three of the blowers 37 (FIG. 2A) feeding into the three respective air intake ducts 121, 122 and 123 (FIG. 4).

Similarly, there are three additional air intake ducts (like ducts 121, 122 and 123) feeding into the three cooling ducts 126 located over and around the series of burner assemblies 106 associated with the right halves of the conveyors 31, 32, 33 as seen in FIG. 2B. The exhaust from the burner cooling ducts 126 seen in FIG. 2B passes up the stack 39 at the output end of the oven.

Referring now to FIG. 3, showing an input end elevational view looking toward the input end of the oven illustrated in FIG. 2A, it is seen that the cooling air flows past the manifold 109 within the duct 126 and between the duct sidewalls 125. Sufficient air is moved through the oven to dilute any hazardous byproduct to at least one quarter the lower explosive limit. Dampers are installed respectively in the intake ducts 121, 122 and 123 and in the exhaust stack 38 in order to maintain a balanced or slightly positive internal oven pressure.

The cooling of the burners is best illustrated in FIG. 4 where it is seen that the burner assemblies 106 receive the gas through a coupling adapter 129 from the common manifold 109, and are ignited by the pilot tube 112, being cooled by air flowing in the cooling duct 126. There is a first, second and third series or bank 131, 132, 133 of the burners 106. These series of burners are associated with the first, second and third pass conveyors 31, 32 and 33, respectively, as will be explained hereinafter.

As described above, cooling air enters the six intake ducts near the middle of the oven 34, and is distributed from the middle of the oven to the exhaust ducts 38 and 39 located at the input and output ends of the oven, respectively. The input half (FIG. 2A) of the first and third series 131 and 133 of burner assemblies 106 receive their cooling air from the intake ducts 121 and 123 (FIG. 4) in the right side of the oven, while the input half of the second series 132 of burners receive their cooling air from the intake duct 122 (FIG. 4) on the left side of the oven. In a similar fashion, the other three intake ducts, not shown, are provided for the oven second half, shown in FIG. 2B, to provide balanced cooling and exhaust so that the cooling ducts 126 in the second half of the oven will provide cooling to complement that in the first half.

The dough blank is transported past the gas-fired infrared burners 106 in three passes on respective conveyors 31, 32, 33. Referring to FIG. 2A there is seen at the upper or input end of the oven 34 the first pass conveyor 31 which extends out beyond the entrance end of the oven a sufficient distance for conveniently receiving the pre-heated dough blanks from the conveyor 26. The first pass conveyor 31 is maintained under tension at its extended end portion by means of a live roller 132, seen best in FIG. 3, mounted on a freely rotating spindle 134, the ends of which are positioned in externally mounted bearing members 136. The bearing members are slidably mounted on the conveyor extension support 138 and maintain the first pass conveyor 31 under constant tension by means of tension springs 144 anchored to the frame at 146. These tension springs 144 pull the bearing members 136 to the left in FIG. 2A by means of sprocket chains 140 passing over sprockets 141 and 142 and connected to the bearing members 136. In order to control the conveyor roller 132 for maintaining its shaft 134 always perpendicular to the length of the conveyor 31 and thus parallel with the drive roller 160 (FIG. 2B) at the other end of the conveyor, the two sprockets 141 (FIG. 3) are both fixed to their shaft 143. Thus, the two slidable bearings 136 are always equally moved by the respective chains 140, because these two chains are coupled together for equal motion by their sprockets 141 being fixed to a common shaft 143.

The first pass conveyor 31 runs through the oven heating section beneath the first bank 131 of radiant burners 106. The conveying travel of the first-pass conveyor 31 is to the right looking at FIGS. 2A and 2B in the direction of the arrow 150. In this working run 150, the conveyor web is supported on multiple rails 154 formed by round wrought iron rods having their ends bent down. During the return run of the conveyor 31 in the direction of the arrow 156, the conveyor web is supported by idler rollers 158 having externally mounted bearings, as illustrated in the inset at 159 in FIG. 3. These bearings 159 are protected by heat shields 173 and suitable isolators 172 to dissipate heat transmitted along the shaft 175 toward the bearing 159. The bearing 159, shaft 175, shield 173 and isolator 172 shown in the inset at the upper left in FIG. 3 are drawn there for purposes of illustration; they are not shown in their actual positions.

In the first pass on the conveyor 31, the preheated dough blanks $T_1$ (FIG. 3) such as for making tortillas are exposed to the first sequence 131 of burners for approximately 12 to 13 seconds at a distance in the range from 4 to 9 inches and preferably of approximately 5 inches from each burner. For the second pass, the tortilla blanks $T_1$ must be turned over and exposed on their second sides for a similar length of time. The turning over of the tortillas is accomplished by means of a turnaround chute 162, positioned, as seen in FIG. 2B, at the discharge end of the working run 150 of the first-pass conveyor 31 at a point beyond the drive pulley 160 of the first-pass conveyor. The turnaround chute 162 has guides to recenter each row of tortilla blanks as they slide around the inside curvature of the chute 162. The web which forms the conveyor 31 is made of stiff stainless steel wires interconnected by hinge loops to provide a web which readily flexes in the longitudinal direction so as to pass around the pulleys 160) (FIG. 2B) and 132 (FIG. 2A). This web is relatively stiff in the transverse direction.

It is to be noted in FIG. 2B that before the first-pass conveyor 31 has passed the last radiant burner 106 in the first burner sequence 131, the conveyor 31 begins to slope downhill and to approach the turnover chute 162 which is immediately adjacent to the beginning of the second-pass conveyor 32. The second gas manifold 109 is tapered downwardly at 167 to provide clearance room for the sloping conveyor 31.

The second-pass conveyor 32 receives the tortilla from the turnover chute 162 and travels past the second sequence 132 of burners 106, in the direction indicated by the arrow 168 in a working run to expose the second side of the tortillas $T_2$ to the burners. The second-pass conveyor 32 is supported in its working run by multiple rod rails 154 and in its return run, indicated by the direction arrow 170, by live rollers 158 in the same manner as described for the first pass-conveyor 31.

There is a second turnover chute 169 (FIG. 2A) beyond the drive pulley 171 at the discharge end of the second-pass conveyor 32. As shown in FIG. 2A, before the second-pass conveyor 32 has passed the last burner 106 in the second sequence 132, this conveyor 32 begins to slope downhill to approach the turnover chute 169. The gas manifold 109 for the third sequence 133 of burners tapers down at 173 to provide clearance for the downslope of the conveyor 32.

After the second side of the tortilla blank $T_2$ has been exposed for approximately 12 to 13 seconds, the tortilla blanks are turned over again and again exposed to radiant heating on their first side for an additional 12 to 13 seconds by means of the third conveyor pass 33 which travels in the direction indicated by the arrow 174 past the third sequence 133 of burners. The tortilla blanks are placed on the third-pass 133 by means of the turnaround chute 169. The third-pass conveyor is supported in its working run 174 on the rail rods 154 and in its return run, indicated by direction arrow 182, on the idler rollers 158 as described for the other two conveyors. After the termination of the third bank of burners 133 the third-pass conveyor transfers the cooked dough product, such as cooked tortillas $T_3$ (FIG. 1B) to transfer conveyor 36 for cooling. The transfer conveyor 36 is located at the discharge end of the third-pass conveyor 133 at a point just beyond its drive pulley 184 (FIG. 2B).

The nondrive terminii of the second and third pass conveyors 32 and 33 contain freely rotating rollers 132 fixed to movable support members. These movable rollers 132 are maintained perpendicular to the conveyor path by means of the interlocked sprockets 141 on a common shaft 143. Thus, the movable idling shafts 134 are held parallel with the power-driven drive pulleys 171 and 184, respectively. The conveyors 32 and 33 are held under tension by pairs of springs 144 and chains 140 in the manner described above for the first-pass conveyor 31.

The surfaces of the conveyor webs of the first, second and third pass should be nonoxidizing, have good infrared reflecting qualities and be of low mass to minimize absorption of heat. Thus, as mentioned above, the conveyors can advantageously be fabricated as wire belts 181 (FIG. 3) from 0.072 stainless steel wire with a one half inch pitch and fifteen spaces such as is provided by the Wire Belt Corporation of America.

To produce tortillas at a production rate of 500 feet per minute, a belt approximately 36 inches wide may carry tortilla blanks $T_1$, $T_2$ and $T_3$ spaced in four rows spread approximately 9 inches on center across the conveyor and 12 inches on centers along the conveyor. This will, at a conveyor speed of approximately 125 feet per minute for each pass, result in an oven which has a cooking section containing sequences 131, 132 and 133 of burners approximately 25 feet in length. Then there is an oven input conveyor extension 186 at the left in FIG. 2A of approximately 5 feet (or of sufficient length to minimize the conducted and radiant heat transfer over to the ingredient mixing and dough forming station 20). In addition, cooling and turnaround spaces, at the input and exit ends of the oven 34, indicated by numerals 188 and 190 respectively, contain approximately three more feet each in length.

Each end of the oven carries framing for the power drives for the conveyors, to be explained in greater detail hereinafter in reference to FIGS. 3 and 5. To increase the efficiency of the oven, reflecting material should be placed within the oven chamber 104 in all locations void of burners. Similarly, the sides of the conveyor and under the wire belt should also be lined with reflecting material to return as much radiant heat to the product as possible. Absorption of heat by the oven structure such as the housing 100 is minimized to control conduction to bearings and to reduce discomfort to personnel working in the immediate area. The oven housing 100 itself should be tight fitting to stabilize the oven internal environment and an external covering is provided in the form of insulation 103. Referring to FIGS. 3 and 4 there is seen the supports 107 of the burner assemblies 106 which receive gas from common manifolds 109, which are surrounded by the cooling hoods 126. A pair of heat shields 191 are provided extending down from the side walls 125 of the hoods 126 on both sides of the burners outside of the pilot tubes 112.

Figure 5:
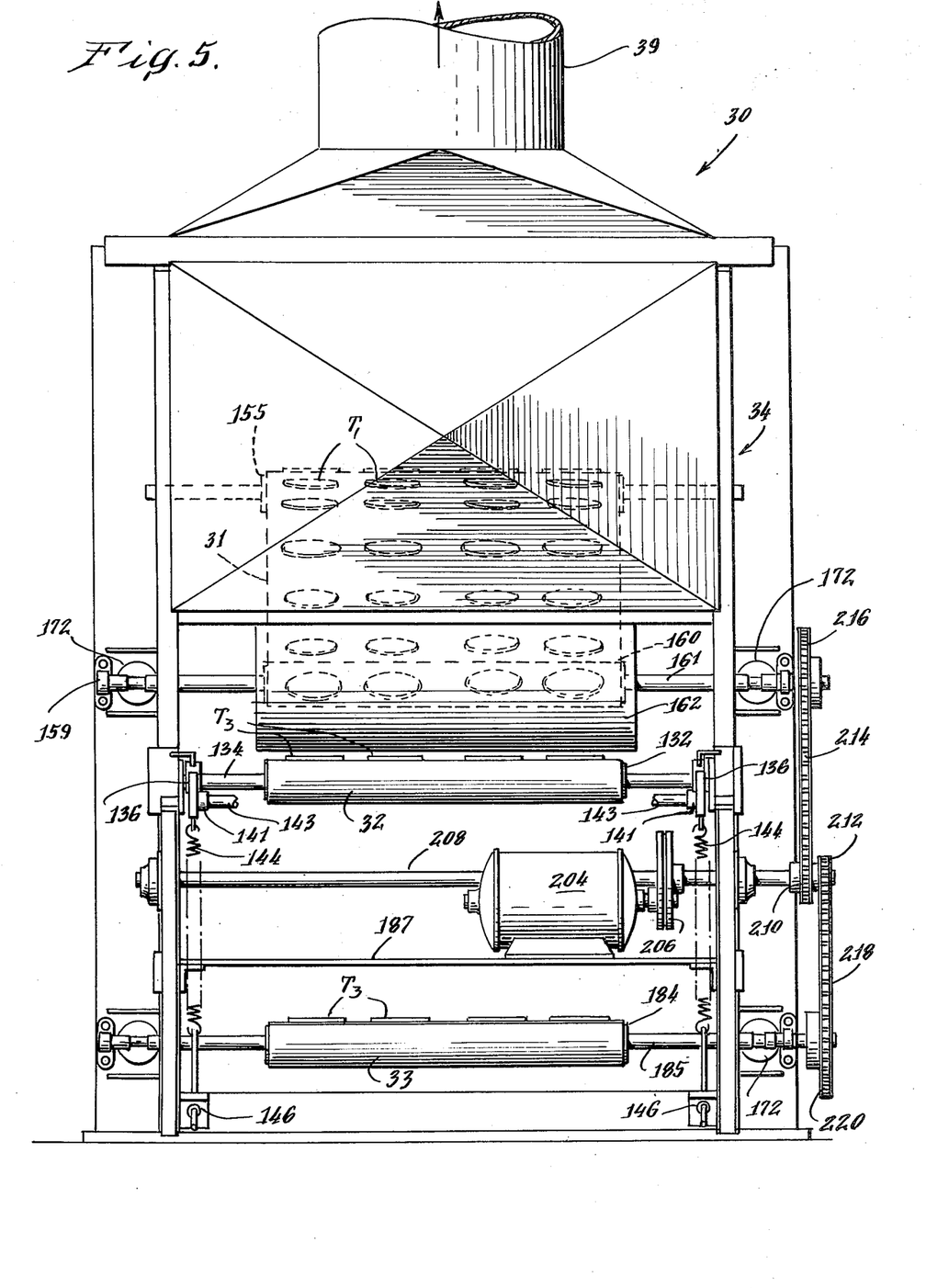
FIG. 5 is an output end elevational view of the discharge end of the oven, as seen with the end covers removed taken along the line 5—5 of FIG. 2B and showing also the conveyor belt drive system for the first and third passes through the oven.

The details of the conveyor belt drive chains and motors which are externally mounted on frames extending from each end of the oven are shown with greater clarity in FIGS. 3 and 5. An induction motor 192, shown in FIG. 3, provides a power output to drive a belt 194 which rotates a jack shaft 196. Appropriate pulleys, as well as clutches, to accommodate jamming, may be provided. The jack shaft 196 has attached to it a sprocket 198 over which passes a chain 200 to drive the sprocket 202 mounted on the end of the second-pass conveyor drive roller 171 (FIG. 2A). The motor 192 is mounted on the oven input extension 186 as seen in FIG. 2A, to minimize adverse heat effects. For the same reason, that is for protection from radiant and conducted heat, the drive chain 200 and bearings of the various rollers are externally mounted, as seen in FIG. 3.

Referring to FIG. 5, there is shown, in a view similar to that of FIG. 3, the discharge or output end of the oven. The tortilla blanks $T_1$ are shown spaced on the first pass conveyor 31, supported on the roller 155, as it descends toward the turnaround chute 162. At the turnaround chute 162, the tortilla blanks are reversed and proceed, on the second pass conveyor 32 through the oven in the opposite direction for cooking of the other side. The first pass conveyor drive pulley or roller 160 is shown mounted on a drive shaft 161. The second pass conveyor 32 is supported on the freely turning roller 132 mounted on the shaft 134 rotating in bearings 136 at the discharge end of the oven. Also at this discharge end of the oven is the drive pulley or roller 184 for the conveyor 33 which is mounted on a drive shaft 185.

The drive pulleys 160 and 184 of the first and third-pass conveyors, respectively, are both driven by means of an induction motor 204 mounted on the oven output extension frame 187 and powering a belt 206 which rotates a jack shaft 208, with appropriate pulleys, and slip clutches provided to accommodate potential jamming. This jack shaft 208 has a pair of output sprockets 210 and 212. Passing around the output sprocket 210 is a chain 214 which drives a sprocket 216 secured to the drive shaft 161 of the second-pass conveyor. Passing around output sprocket 212 is a chain 218 which drives a sprocket 220 secured to the drive shaft 185 of the third-pass conveyor 33. As can be seen in FIG. 5, the motor, chain drives and bearings are externally mounted for protection from radiant and conducted heat, as in the manner at the input end of the oven shown in FIG. 3.

Since both the first and third pass conveyors are driven by drive chains from sprockets mounted on a common jack shaft 208 the progressional inter-relationship of tortilla blanks $T_1$ and $T_3$ on the first-pass and third-pass conveyors will remain the same. Thus, the travel of tortilla blanks $T_1$ into the oven on the first-pass conveyor and travel of the cooked tortilla $T_3$ out of the oven on the third-pass conveyor does not change the relative positions of the tortillas one with respect to another in each of the four rows. In addition, the second-pass conveyor 32 is driven by a jack shaft powered by a similar induction motor 192. These two induction motors 192 and 204 are sufficiently synchronized so that the relationship of the tortilla blanks remains essentially identical when passing through the entire oven cooking process. It will be understood by those skilled in the art that the speeds of the three conveyors 31, 32 and 33 may be matched through selection of the appropriate drive pulley and sprocket diameters so as to obtain equal speed reductions.

Figure 6:
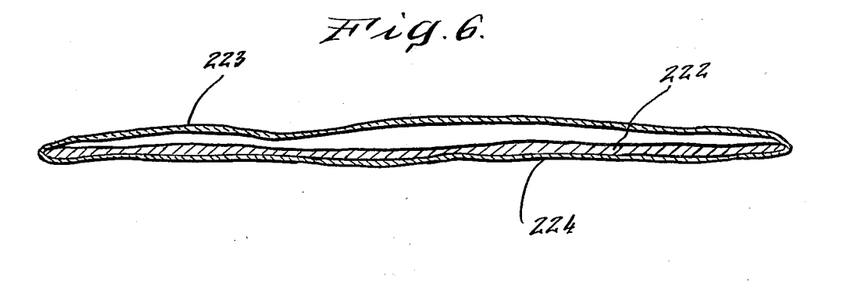
FIG. 6 is an enlarged cross-sectional view through a properly formed and cooked tortilla, illustrating the central layer and the upper flexible free skin with the lower skin attached to the central layer.

FIG. 6 illustrates a properly formed cooked tortilla prepared according to the method of this invention. Referring thereto, it can be seen, in an enlarged crosssectional view, that the tortilla possesses a moist central layer 222 surrounded by upper and lower flexible skins 223 and 224, which when cooked according to this invention are light colored. The upper skin has been blown free of the central layer 222 by internal steam generation during the third pass as previously described.

Figure 7:
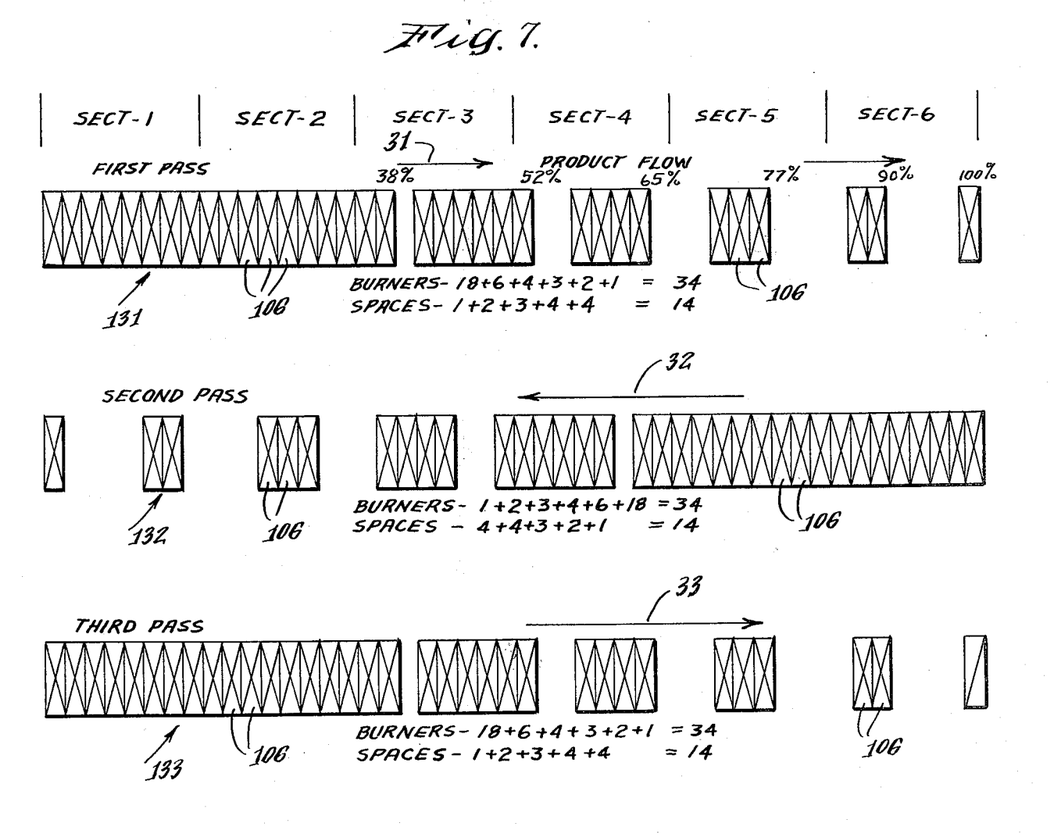
FIG. 7 shows, in schematic form, an illustrative plan for placement of burners to obtain a heating pattern according to an embodiment of this invention.

FIG. 7 illustrates a basic plan according to an embodiment of this invention for placement of the infrared radiant burner assemblies 106 to obtain the desired heating pattern. It should be understood that the arrangement shown in FIG. 7 is an example and that various similar arrangements may be used according to the oven throughput desired and the precise tortilla characteristics to be obtained.

Referring to FIG. 7, it is seen that the oven, such as 34 in FIGS. 2A and 2B is represented as being divided ito six sections for convenience of understanding of the burner placement plan. The flow of product proceeds in the direction of the arrows. Each cross-hatched rectangle can be considered to be one burner assembly 106 extending across the width of the oven and to which the tortilla or other dough blank is exposed. Empty spaces between rectangles 106 represent the absence of infrared burners and can be considered to be the capped regions 110 of the gas manifold previously described with respect to FIG. 2A.

Thus, as shown in FIG. 7, there are a sub-total of eight spaces in each section, making an overall total of 48 spaces, 34 of which are occupied by the burners while 14 are free spaces. More importantly, there are the three series or sequences 131, 132 and 133 of burners. In each series in the direction of travel the burners are arranged in a predetermined sequence as follows: 18 burners, 1 space, 6 burners, 2 spaces, 4 burners, 3 spaces, 3 burners, 4 spaces, 2 burners, 4 spaces, and one burner at the end of the pass. Each tortilla blank proceeds along a path 31, 32 or 33 through a radiant heating sequence in the direction shown by the arrow. As it progresses along each path it is initially exposed to an intensive radiant heating effect followed by a progressively decreasing radiant heating effect.

The burner placement plan illustrated in FIG. 7 may be considered exemplary for an oven having a cooking zone length of approximately 25 feet when the product velocity through the oven on each of three conveyors 31, 32 and 33 is approximately 125 feet per minute. Thus each tortilla side in each pass is exposed to the infrared heat for approximately 12 to 13 seconds. If the exposure is at a distance of approximately 5 inches from the burners, then the pattern shown will employ an energy output of approximately 15,600 Btu's per hour per burner assembly 106.

This heat output per burner of 15,600 Btu's per Hr. is provided when the burners 106 are adjusted for maximum efficiency using natural gas having an energy value of 1,000 Btu's per cubic foot. The temperature of the radiant combustion occurring adjacent to the elongated ceramic plate extending across the lower face of each housing 107 is in the range of 1,200° F to 1,800° F. With the tortilla blanks travelling by each burner 106 at a distance in the range from 4 to 9 inches, there is an intensive impingement of radiant heat energy upon the surface of the passing tortillas.

The rate of applying radiant heat to the dough blanks is critical as to:

a. The total radiant heat energy applied to the raw or partly cooked dough blank while it is in the oven, and b. The time distribution of radiant heat energy applied to each side. There must be a progressive reduction in radiant heat energy applied to a given side after initial intensive heat energy has commenced to be applied to that side.

If the total radiant heat energy applied during the oven residence time is too low, the dough blanks will remain partly raw in the interior and possibly at the surfaces. If the total radiant heat energy applied during the oven residence time is too great, the dough surfaces will become overcooked and burned or blackened and brittle. The interior may also be overcooked or it may remain partly raw, in spite of surface burning depending upon the distribution of the radiant heat energy throughout the oven.

For proper cooking and commercially accepteable characteristics, the radiant heat energy must be applied at a rate comparable to the heat absorption rate of the raw or partly cooked dough blank which is a function of how fast this heat energy can be transmitted into the central layer 222 (FIG. 6). When this absorption rate is exceeded, the outside surfaces will become burned and overcooked while leaving the interior raw. The burned outer skin is brittle and will crack, rendering the tortilla product useless for the preparation of such food dishes as require rolling the tortillas about various food ingredients or stuffing them with such ingredients. Moreover, in order to produce commercially an economically large number of tortillas per minute in an oven of reasonable size and economy, it is necessary to apply radiant heat energy at a high average rate during the residence time in the oven.

Figure 8:
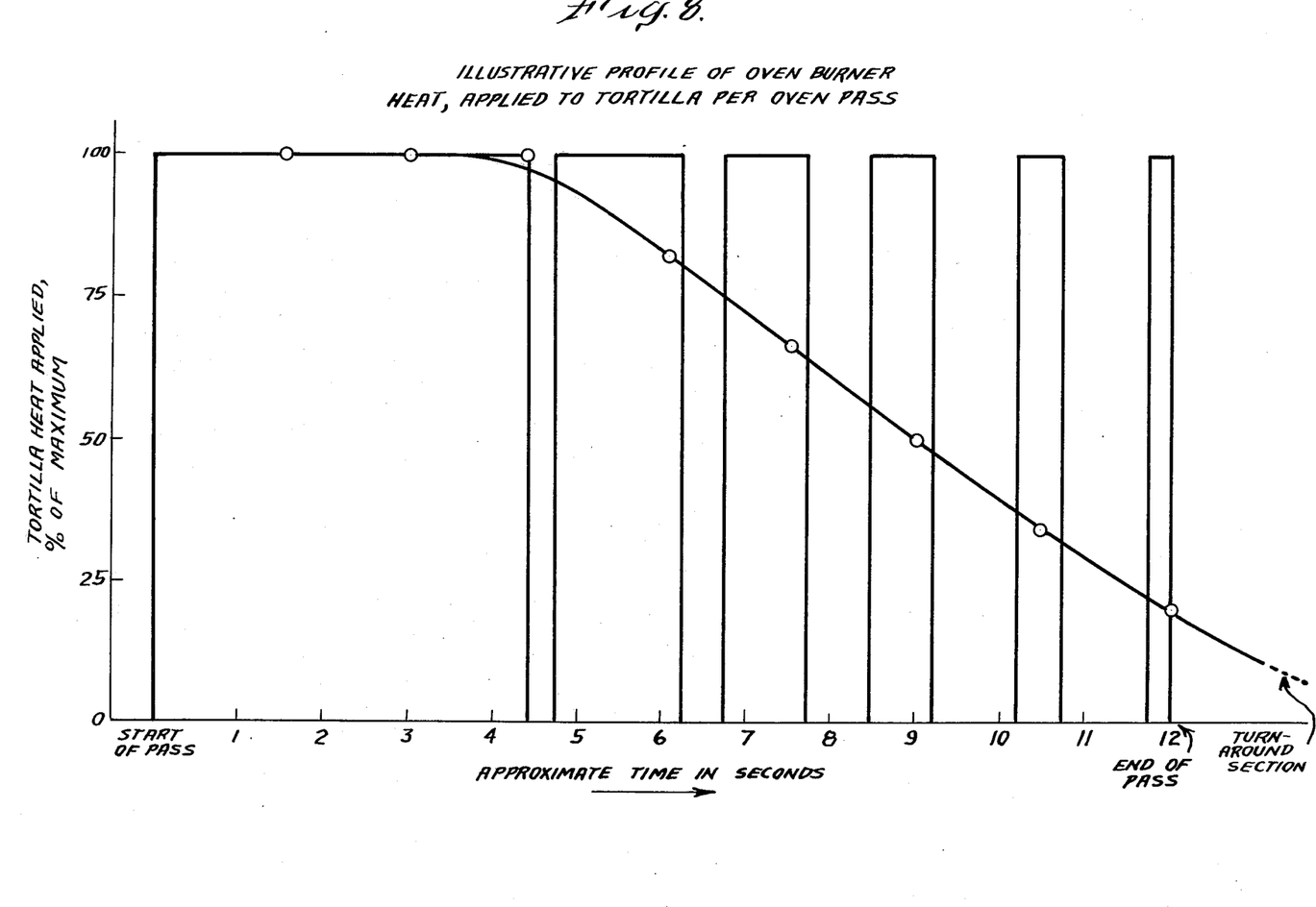
FIG. 8 is a graph presenting an illustrative profile of the infrared heating effect applied to a tortilla during each oven pass.

I have found a cooking method and apparatus which advantageously meets these conflicting criteria. The dough is pre-heated by mixing corn flour with heated water at a temperature in the range from 115° F to 165° F. Then the tortilla blanks are traversed through the oven 34 and are subjected to the successive radiant heating patterns discribed above and as shown in FIGS. 7 and 8. The first side of the raw formed pre-heated tortilla is initially exposed to intensive radiant heating effect which endures for at least the first 25 percent of the first-pass 31 but which does not endure beyond 65 percent of this path. Thereafter, the radiant heating effect is progressively decreased for allowing time for the heat energy which has already been absorbed by the surface of each tortilla blank to become transmitted into the interior. At the same time moisture in the interior begins to become heated up and migrates toward the surface. This heat application pattern serves to gelatinize the corn flour to the desired texture and consistency, and to begin to brown the first side and form a skin thereon.

As the surface layer is thus becoming cooked, it becomes progressively less capable of absorbing further heat energy, moreover, its becoming browned increases its radiant heat absorption coefficient (i.e., reduced reflectivity occurs) and so the application of further radiant heat energy to this partially cooked surface is progressively decreased in inverse proportion to the amount of cooking which has already occurred.

In the illustrative example shown in FIGS. 7 and 8, the initial intensive heating effect continues for 18 burners, which constitutes approximately 38 percent of the first pass 31. Then there is a space followed by 6 more burners, at the completion of which point the tortilla blank has travelled approximately 52 percent of the first path. Then there are two spaces followed by 4 more burners, at the completion of which the tortilla blank has travelled approximately 65 percent of the first path. Three more spaces and three more burners completes 77 percent of the first path. Four more spaces and two burners completes 90 percent of the first path. A final four spaces and one last burner completes 100 percent of this path.

The following table shows, for this example, the percentage of the total radiant heat energy which has been applied as a function of the percentage of the total pass distance travelled (or as a function of the total elapsed time):

| PERCENTAGE OF TOTAL RADI-ANT HEAT ENERGY APPLIED: | PERCENTAGE OF TOTAL PASS TRAVELLED: |
| --- | --- |
| 18% | 12.5% |
| 35% | 25% |
| 53% | 37.5% |
| 68% | 50% |
| 71% | 52% |
| 79% | 62.5% |
| 82% | 65% |
| 88% | 75% |
| 91% | 77% |
| 94% | 87.5% |
| 97% | 90% |
| 100% | 100% |

The following table shows, for this example, the relative intensity of time-weighted average of radiant heat energy applied along each one-eighth portion (12.5 percent) of the pass length as a percentage of the maximum.

| RELATIVE INTENSITY OF RADIANT HEAT ENERGY BEING APPLIED: | EACH ONE-EIGHTH OF THE PASS LENGTH: |
| --- | --- |
| 100% | 1 |
| 100% | 2 |
| 100% | 3 |
| 83% | 4 |
| 67% | 5 |
| 50% | 6 |
| 33% | 7 |
| 20% | 8 |

The intensity in the last one-eighth of the pass is reduced below what might appear from FIG. 7 alone, because, as shown in FIG. 2B, the conveyor 31 slopes downwardly farther away from the last burner in the first series 131.

The plot shown in FIG. 8 is based upon the above table, except that the plot is a smoothed curve of the points corresponding to these percentages. FIG. 8 is a graph presenting a time-weighted average of radiant heat applied to each tortilla per oven pass as a percent of maximum heat input. Maximum heat input is considered to represent continuous exposure to infrared heat, i.e., all burners and no spaces, in the oven. Thus, the illustrative profile of oven burner heat shows the applied radiant energy progressively decreasingly from the beginning of the pass to its termination.

In addition to the pass past the series of burners, which for example extends for 25 feet, there are the end sections 188 and 190 of the oven 34 in which only very little radiant energy is applied. There is a travel of approximately three feet to the turn around chute 162 and a further travel of three feet before reaching the second series 132 of burners. It takes about three (3) seconds for the blanks to travel the 6 feet in the end sections 188 & 190 to and from and around the chute 162 & 169. During this travel time heat energy continues to be transmitted into the interior of the tortilla blank. FIGS. 7 and 8 should be understood in consideration of the fact that each conveyor path actually includes these end sections.

Among the many advantages of this invention is that the upper sides of the dough blanks on the first conveyor 31 are seared and cooked to begin forming a skin thereon. Thus, it is a cooked surface which slides against the chute 162. The same relationship occurs during the second pass 32, for the cooked upper side of the tortilla slides against the turn around chute 169. This advantage is not realized in prior art equipment which cooks the bottom sides on heated slats and then has difficulty in turning the product on a moist uncooked surface.

The same occurs in the second pass with respect to the second side of the tortilla. It is to be understood that some cooking of the second surface of the tortilla occurs during the first pass, and so less heat energy (Btu's) is provided by the second series 132 of radiant burners. The second surface has already begun to darken in color somewhat, so it already has a higher radiant heat absorption coefficient. Consequently, the second cooking pass has a heat application pattern which is similar to the first, but the burners may be operated at a reduced heat output rate.

The third pass has a similar radiant heat application pattern. Sufficient heat is obtained to blow and expand the skin for the formation of the large blister. With the rate of absorption controlled as illustrated in FIG. 8, the tortilla cooks properly throughout but does not burn or dry out on the surface to the extent that brittleness will occur.

A better appreciation of the advantages of this invention is obtained when it is realized that the foregoing burner arrangement results in an attractive product of the type illustrated in FIG. 6, with considerably reduced heat requirements. Thus, calculations based on the assumption of an oven running at one half maximum output of heat, for example 795,600 Btu per hour are used to cook 500 tortillas per minute, shows that the heat requirement, in Btu per tortilla, in a system according to this invention, is only 26.5. In comparison, present tortilla cooking machines are known to require as much as 57 Btu's per tortilla and 95 Btu's per tortilla.

In order to keep the conveyors as cool as possible within the oven, many of the shafts 175 (FIGS. 3 and 4) are made hollow. The ends of these shafts 175 near their external bearings 159 have gaps therein which are also external of the insulating shell 103 of the furnace. Thus cooling air can pass through the hollow shafts. The heat isolators 172 comprise arcuate members which bridge the gaps in the shaft and which have centrifugal impeller blower blades associated therewith for forcing ambient air to flow through the shafts and bearings. Thus, the blanks are advantageously not burned or scorched where they come into contact with the wire belt.

The cooked tortillas $T_3$ (FIG. 1B) travel down the transfer conveyor 36 which passes through an opening 226 in the second floor and enter the cooling station 40 for allowing the product to cool. The back-and-forth conveyors 44 are driven by motors 228 (FIG. 1B) and 230 (FIG. 1A), and there are turn-around chutes 232 at each end of the cooler station 40 for transferring the tortillas from one conveyor 44 to the next lower one. The total residence time of the cooked tortillas in the cooling station is at least three and one-half minutes and preferably is at least four minutes or more depending upon the ambient humidity, because the internal free moisture is to be removed as well as cooling the tortillas down to room temperature. The cooled and properly de-moisturized tortillas 52 are fed down the delivery conveyor 50 ready for further handling.

Accordingly, it will be understood that the system and method described herein is particularly suitable for the commercial manufacture of dough foodstuffs at a high rate with increased efficiency and economy of operation through the lower heat input requirements. At the same time, the desired texture, consistency and appearance of the product, corresponding to consumer preferences of quality, is obtained. The invention is particularly suitable for the manufacture of tortillas and an output rate of 500 tortillas per minute is readily achieved with a consequent savings in capital costs since the oven is the significant piece of machinery in comparison to the other production equipment illustrated in FIGS. 1A and 1B.

The characteristics of the product and efficiency of the operation may be adjusted as desired according to the dough foodstuffs being cooked or according to the parameters that are advantageously predetermined for any particular process. This may be obtained by utilizing the means disclosed herein and the disclosed method of cooking with a predetermined heating pattern utilizing decreasing infrared heat input and various oven passes. Those skilled in the art may adjust this teaching to their own particular environment.

I claim:

1. In a method for producing tortillas wherein the tortilla dough is shaped into the desired blank shape and then the blank is cooked in an oven, the improved method for automatically producing cooked tortillas having commercially desirable and consistent predetermined characteristics including a moist interior layer surrounded by top and bottom flexible skins which are attractively lightly browned and in which the top browned skin has sufficient integrity, flexibility and self-supporting strength that it can be lifted away from such moist interior layer by the consumer for inserting edible fillings, comprising the steps of:

mixing together flour and liquid to form a tortilla dough, pre-heating the tortilla dough, forming the such dough into pre-heated blanks for tortillas, feeding the pre-heated tortilla blanks in an oven along a first path supported upon an infrared radiation reflecting conveyor web having low mass and multiple spaces therein, said first path extending past a first series of infrared heaters located above and directed at top surfaces of the blanks, said first series of infrared heaters initially applying intensive radiant heating effect to said top surfaces and thereafter applying progressively decreasing radiant heating effect to said top surfaces, as said blanks are fed along said first path, for searing and cooking said top surfaces in order to begin forming a skin thereon, turning said blanks over after they have completed said first path for facing upwardly the bottom surfaces of the inverted blanks, feeding the inverted blanks in the oven along a second path supported upon an infrared radiation reflecting conveyor web having low mass and multiple spaces therein, said second path extending past a second series of infrared heaters located above and directed at the lower surfaces of the inverted blanks, said second series of infrared heaters initially applying intensive radiant heating effect to said bottom surfaces and thereafter applying progressively decreasing radiant heating effect to said bottom surfaces, as said inverted blanks are fed along said second path, for searing and cooking said bottom surfaces in order to form a skin thereon, turning said blanks over after they have completed said second path for again facing upwardly the top surfaces of the blanks, feeding the blanks in the oven along a third path supported upon an infrared radiation reflecting conveyor web having low mass and multiple openings therein, said third path extending past a third series of infrared heaters directed at the top surfaces of the blanks, said third series of infrared heaters initially applying intensive radiant heating effect to said top surfaces and thereafter applying progressively decreasing radiant heating effect to said top surfaces, as said blanks are fed along said third path, for completing the formation of top browned skins on the tortillas and for forming steam beneath said top browned skins for blistering them away from a moist interior layer with said top browned skins having sufficient integrity, flexibility and self-supporting strength to be lifted away from the moist interior layer if desired for inserting edible fillings into the tortilla, and after completion of said third path conveying each cooked tortilla separate from other cooked tortillas for individually exposing them on both surfaces through the air to cool the cooked tortillas and to allow residual moisture to escape from them so that they can be stacked up without sticking together.

2. The improved method for automatically producing cooked and cooled tortillas as claimed in claim 1, in which:

said intensive radiant heating effect along each of said three paths endures for at least 25 percent of the respective path but not exceeding 65 percent of the path and thereafter progressively decreases.

3. The improved method for automatically producing cooked and cooled tortillas as claimed in claim 1, in which:
said infrared heaters have a temperature of at least 1,200° F and said first path passes at a distance therefrom in the range from 4 to 9 inches.

4. The improved method for automatically producing cooked and cooled tortillas as claimed in claim 1, in which:
said first path and said second path each contain end sections located away from the respective series of infrared heaters,
said tortilla blanks being turned over in said end sections, and
said end sections providing additional time for heat energy to be transmitted from the surfaces into the moist interior of each blank for cooking the moist interior.

5. The improved method for automatically producing cooked and cooled tortillas as claimed in claim 1, in which:
said tortilla blanks are cooked by said three series of infrared heaters during a total residence time in the oven in the range from 36 seconds to 48 seconds.

6. The improved method for automatically producing cooked and cooled tortillas as claimed in claim 2, in which:
said infrared heaters in said three series have temperatures in the range from 1,200° F to 1,800° F, and
said first, second and third paths pass said tortilla blanks at a distance in the range from 4 to 9 inches from said infrared heaters.

7. The improved method for automatically producing cooked and cooled tortillas as claimed in claim 1, in which:
cooling air is continuously blown through the oven for forced air circulation cooling of the interior of the oven,
the tortilla blanks are conveyed along said first, second and third paths in four rows at a distance in the range from 4 to 9 inches from said infrared heaters and at a rate of approximately 500 tortillas per minute, and
said infrared heaters are at a temperature in the range from 1,200° F to 1,800° F.

8. The improved method for automatically producing cooked and cooled tortillas as claimed in claim 1, in which:
said series of infrared heaters along each of said three paths applies infrared radiation to the tortilla blanks passing along the respective path in accordance with the curve shown in FIG. 8.

9. The improved method for automatically producing cooked and cooled tortillas as claimed in claim 1, in which:
said series of infrared heaters along each of said three paths are arranged in accordance with the patterns shown in FIG. 7.

10. The method for high-speed cooking of tortilla dough blanks to consistently produce cooked tortillas each having a moist cooked interior layer surrounded by browned top and bottom skin-like layers, possessing sufficient flexibility for rolling and having the top skin-like layer blistered away from the moist cooked interior layer and in which the top skin-like layer has enough integrity, flexibility and self-supporting strength that it can be lifted away from the interior layer by the consumer for inserting edible fillings, said method comprising the steps of
conveying tortilla dough blanks top surface up along a first path extending generally horizontally beneath a first sequence of infrared heaters which direct infrared radiant energy downwardly onto the top surfaces of the tortilla blanks,
said infrared heaters of said first sequence being at temperatures in the range from 1,200° F to 1,800° F,
said first sequence of infrared heaters initially applying intensive radiant heating effect to the top surfaces of said tortilla dough blanks and thereafter applying progressively decreasing radiant heating effect to said top surfaces, as said blanks are conveyed along said first path, for searing and cooking said top surfaces in order to begin forming a skin thereon,
turning said blanks over after they have completed said first path for facing upwardly the bottom surfaces of the inverted blanks,
conveying the inverted blanks in the oven along a second path extending generally horizontally beneath a second sequence of infrared heaters which direct infrared radiation downwardly onto the bottom surfaces of the tortilla blanks,
said infrared heaters of said second sequence being at temperatures in the range from 1,200° F and 1,800° F,
said second sequence of infrared heaters initially applying intensive radiant heating effect to said bottom surfaces and thereafter applying progressively decreasing radiant heating effect to said bottom surfaces, as said inverted blanks are conveyed along said second path, for searing and cooking said bottom surfaces in order to form a skin thereon,
turning said blanks over after they have completed said second path for again facing upwardly the top surfaces of the blanks,
conveying the blanks in the oven along a third path extending generally horizontally beneath a third sequence of infrared heaters which direct infrared radiant energy downwardly onto the top surfaces of the tortilla blanks,
said infrared heaters of said third sequence being at temperatures in the range from 1,200° F to 1,800° F,
said third sequence of infrared heaters initially applying intensive radiant heating effect to said top surfaces and thereafter applying progressively decreasing radiant heating effect to said top surfaces, as said blanks are conveyed along said third path, for completing the formation of top browned skins on the tortillas and for forming steam beneath said top browned skins for blistering them away from a moist interior layer with said top browned skins in the tortillas after cooling to room temperature having sufficient integrity, flexibility and self-supporting strength to be lifted away from the moist interior layer if desired by the consumer inserting edible fillings into the tortilla, and
after completion of said third path conveying each cooked tortilla separate from other cooked tortillas for individually exposing them on both surfaces through air to cool the cooked tortillas to room temperature and to allow residual moisture to escape from them so that they can thereafter be stacked up without sticking together.

11. The method for high-speed cooking of tortilla dough blanks as claimed in claim 10, in which:
said tortilla blanks are conveyed along each of said first, second and third paths by a conveyor web which reflects infrared radiation and is of low mass for minimizing absorption of the infrared radiation and has multiple openings therein for permitting evaporation from the surfaces of the tortilla blanks in contact with the web.

12. The method for high-speed cooking of tortilla dough blanks as claimed in claim 10, in which:
said intensive radiant heating effect along each of said three paths endures for at least 25 percent of the respective path but not exceeding 65 percent of the path and thereafter progressively decreases.

13. The method for high-speed cooking of tortilla dough blanks as claimed in claim 12, in which:
said first path includes a first end section sloping downwardly located away from the first sequence of infrared heaters, with the tortilla blanks being turned over by a first arcuate chute near the end of said first section and with said top surface skins of the tortilla blanks sliding against said first arcuate chute, and
said second path includes a second end section sloping downwardly located away from the second sequence of infrared heaters, with the tortilla blanks being turned over by a second arcuate chute near the end of said second section, and with the bottom surface skins of the tortilla blanks sliding against said second arcuate chute.

14. The method for high-speed cooking of tortilla dough blanks as claimed in claim 13, in which:
the dwell time of each tortilla blank in the oven is in the range from 36 seconds to 48 seconds.

15. The method for high speed cooking of tortilla dough blanks as claimed in claim 11, in which:
the tortilla blanks are conveyed along said first, second and third paths at a speed of approximately 125 feet per minute.

16. The method for high-speed cooking of tortilla dough blanks as claimed in claim 10, in which:
the tortilla blanks are exposed to said first, second and third sequences of infrared heaters for approximately 12 to 13 seconds for each sequence.

17. The method for high-speed cooking of tortilla dough blanks as claimed in claim 11, in which:
the tortilla dough blanks are conveyed in four rows spaced approximately nine inches on centers laterally of the conveyor web and spaced approximately twelve inches on centers longitudinally of the conveyor web, and
approximately 500 cooked and cooled tortillas are produced per minute.

* * * * *